US012625996B2

(12) United States Patent
K et al.

(10) Patent No.: US 12,625,996 B2
(45) Date of Patent: May 12, 2026

(54) METHOD TO PREVENT DATA THEFT FROM A STORAGE DEVICE

(71) Applicant: Sandisk Technologies, Inc., Milpitas, CA (US)

(72) Inventors: Shiva K, Bangalore (IN); Saurabh Singh, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 137 days.

(21) Appl. No.: 18/743,113

(22) Filed: Jun. 14, 2024

(65) Prior Publication Data
US 2025/0384151 A1     Dec. 18, 2025

(51) Int. Cl.
*G06F 21/62*          (2013.01)
(52) U.S. Cl.
CPC ................................ *G06F 21/6218* (2013.01)
(58) Field of Classification Search
CPC ................................................. G06F 21/6218
See application file for complete search history.

(56) References Cited

U.S. PATENT DOCUMENTS

| | | | |
|---|---|---|---|
| 10,558,376 B2 | 2/2020 | Hahn et al. | |
| 11,755,527 B2 | 9/2023 | Tamir et al. | |
| 2021/0286560 A1* | 9/2021 | Lee ...................... | G06F 3/0604 |
| 2022/0391318 A1* | 12/2022 | Singh .................. | G06F 12/0246 |
| 2023/0237184 A1* | 7/2023 | Shin ...................... | G06F 21/53 |
| | | | 726/26 |

* cited by examiner

*Primary Examiner* — Viet D Vu
(74) *Attorney, Agent, or Firm* — Patent Law Works LLP

(57)          ABSTRACT
A method for assessing a data access request to a data storage device (DSD) by a computer program, the method comprising: assigning a plurality of queues to a plurality of computer programs, wherein each computer program is configured to authentically access one partition of a plurality of partitions of a non-volatile storage medium of the DSD using one queue of the plurality of queues assigned to that computer program and corresponding to that one partition; receiving, from the computer program, a data access request to access a first partition of the plurality of partitions using a first queue of the plurality of queues; and assessing the data access request by: determining whether the one queue of the plurality of queues corresponding to the first partition is the first queue; and in response to determining the one queue of the plurality of queues corresponding to the first partition is the first queue, determining the first queue is authentic to assess the first partition.

20 Claims, 8 Drawing Sheets

300

METHOD TO PREVENT DATA THEFT FROM A STORAGE DEVICE

TECHNICAL FIELD

This disclosure relates to assessing a data access request to a data storage device (DSD) by a computer program to prevent unauthorized or malicious access to the storage device.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the computing system. From the perspective of the computing system, a data storage device (DSD) is typically implemented as a block storage device where the data stored is in the form of one or more blocks, being sequences of bytes or bits having a maximum length, referred to as block size.

DSDs are commonly used to supplement the data storage capabilities of a computer system. For example, DSDs are often standalone physical devices that house an internal storage component, such as a hard disk drive (HDD) or a solid state drive (SSD), that provides a host computer system with an additional portion of non-volatile memory (i.e., the volume of the drive) in which to store digital data. These drive-type devices are connectable to the host computer system via a data path operating over a particular connectivity protocol (e.g., via a Universal Serial Bus (USB) cable or Peripheral Component Interconnect Express (PCIe) bus). In response to being connected to the host computer system, the host computer system recognizes the drive as a block data storage device such that a user of the device may access the storage of the drive via the data path (e.g., through operations of the host computer system). Access to the drive typically enables one or more users of the host computer system and computer programs on the host computer system to access (e.g., read, write and/or modify) user data stored on the drive.

It is desirable to secure the user data content of a DSD against unauthorized or malicious access by the computer programs on the host computer system to prevent data theft from a storage device. However, traditional security measures implemented on host computer systems, such as anti-virus software, are typically resource-intensive (e.g., consuming a large amount of central processing unit (CPU) power of the host computer systems). Furthermore, it is challenging to assess data access requests from diverse computer programs, particularly for these computer programs that have been legitimately installed on the host computer system and/or granted access by the user but are susceptible to malicious attacks (e.g., hacking) subsequently.

SUMMARY

Disclosed herein is a method for assessing a data access request to a data storage device (DSD) by a computer program, the method comprising: assigning a plurality of queues to a plurality of computer programs, wherein each computer program is configured to authentically access one partition of a plurality of partitions of a non-volatile storage medium of the DSD using one queue of the plurality of queues assigned to that computer program and corresponding to that one partition; receiving, from the computer program, a data access request to access a first partition of the plurality of partitions using a first queue of the plurality of queues; and assessing the data access request by: determining whether the one queue of the plurality of queues corresponding to the first partition is the first queue; and in response to determining the one queue of the plurality of queues corresponding to the first partition is the first queue, determining the first queue is authentic to assess the first partition.

In some embodiments, assessing the data access request further comprises: determining whether the one of the plurality of partitions the computer program is configured to access is the first partition; and in response to determining the one of the plurality of partitions the computer program is configured to access is the first partition, determining the computer program is authentic to access the first partition.

In some embodiments, the method further comprises allowing the data access request for accessing the first partition in response to determining both the first queue and the computer program are authentic to assess the first partition.

In some embodiments, assigning the plurality of queues to the plurality of computer programs comprises generating a data indexing structure having information for each computer program, including (i) the one of the plurality of partitions that each computer program is configured to access, and (ii) the one queue of the plurality of queues assigned to that computer program.

In some embodiments, the data indexing structure having information for each computer program further includes (iii) the one queue of the plurality of queues corresponding to the one of the plurality of partitions.

In some embodiments, determining whether the one queue of the plurality of queues corresponding to the first partition is the first queue and/or determining whether the one of the plurality of partitions the computer program is configured to access is the first partition comprises retrieving information from the data indexing structure.

In some embodiments, each queue of the plurality of queues comprises a queue identifier used by a driver of a host computer system to assign one of the plurality of queues to one of the plurality of computer programs.

In some embodiments, determining whether the one queue of the plurality of queues corresponding to the first partition is the first queue includes: determining whether a first queue identifier of the first queue matches a second queue identifier of the one queue of the plurality of queues corresponding to the first partition; and in response to determining the first queue identifier matches the second queue identifier, determining the one queue of the plurality of queues corresponding to the first partition is the first queue.

In some embodiments, in response to determining the one queue of the plurality of queues corresponding to the first partition is not the first queue and/or the one of the plurality of partitions the computer program is configured to access is not the first partition, determining the data access request is not authentic; and in response to determining the data access request is not authentic, rejecting the data access request.

In some embodiments, the method further comprises in response to determining the data access request is not authentic, attempting to authenticate the data access request in a different way.

In some embodiments, the attempting to authenticate the data access request a different way includes providing a one-time authentication for the data access request.

In some embodiments, the attempting to authenticate the data access request a different way includes providing a long-term authentication to authenticate the computer program to access the first partition using the first queue.

In some embodiments, attempting to authenticate the data access request in a different way includes receiving from a user of the host computer system a first credential for the one-time authentication and/or a second credential for the long-term authentication.

In some embodiments, in response to receiving the first credential, allowing the data access request by allowing access to the first partition by the computer program on a one-off basis.

In some embodiments, in response to receiving the second credential, updating the data indexing structure to include: the first partition as an additional partition configured for access by the computer program; the first queue as an additional queue of the plurality of queues assigned to the computer program; and/or the first queue as an additional queue of the plurality of queues corresponding to the first partition; and/or allowing the data access request by allowing access to the first partition.

In some embodiments, assigning the plurality of queues to the plurality of computer programs is based on data characteristics of the computer programs.

In some embodiments, the data characteristics include a confidentiality of the data used by the computer program, wherein the confidentiality of the data is grouped into a plurality of levels, and wherein one or more computer programs of the plurality of computer programs having a same level are configured to access a same partition of the non-volatile storage medium.

In some embodiments, the DSD is a non-volatile memory express (NVMe) device including a plurality of I/O queues, and wherein the plurality of queues are a subset of the plurality of I/O queues.

Also disclosed herein is a data storage device (DSD) comprising: a non-volatile storage medium configured to store data; a data path configured to transmit at least data between the non-volatile storage medium of the DSD and a host computer system; and one or more processors, individually or in combination, configured to: assign a plurality of queues to a plurality of computer programs, wherein each computer program is configured to authentically access one partition of a plurality of partitions of the non-volatile storage medium using one queue of the plurality of queues assigned to that computer program and corresponding to that one partition; receive, from a computer program, a data access request to access a first partition of the plurality of partitions using a first queue of the plurality of queues; and assess the data access request by: determining whether the one queue of the plurality of queues corresponding to the first partition is the first queue; and in response to determining the one queue of the plurality of queues corresponding to the first partition is the first queue, determining the first queue is authentic to assess the first partition.

Further disclosed herein is a data storage device (DSD) comprising: means for storing data; means for transmitting at least data between a host computer system and the data storage device; means for assigning a plurality of queues to a plurality of computer programs, wherein each computer program is configured to authentically access one partition of a plurality of partitions of a non-volatile storage medium of the DSD using one queue of the plurality of queues assigned to that computer program and corresponding to that one partition; means for receiving, from a computer program, a data access request to access a first partition of the plurality of partitions using a first queue of the plurality of queues; and means for assessing the data access request by: means for determining whether the one queue of the plurality of queues corresponding to the first partition is the first queue; and means for determining, in response to determining the one queue of the plurality of queues corresponding to the first partition is the first queue, the first queue is authentic to assess the first partition.

BRIEF DESCRIPTION OF DRAWINGS

Some embodiments are described herein below with reference to the accompanying drawings, wherein.

DESCRIPTION OF EMBODIMENTS

Data storage devices (DSDs) may be subject to unauthorized, suspicious and/or malicious access to data stored in the DSDs. Typically, one or more computer programs on a host computer system execute data access operations to a data storage device (DSD) that is connected to the host computer system. These data access operations may be performed either in accordance with user instructions or autonomously by the computer programs that have obtained authentication from the user. Usually, a computer program prompts users for permissions (e.g., to access photos/documents and cameras) during the configuration process of the computer program. After acquiring permission from the user to access the DSD, each computer has full access to all the data saved on a storage medium of the DSD.

In some access control approaches for DSDs, the host computer system monitors the namespaces into which computer programs write (e.g., by using a namespace-to-computer program mapping table). However, this monitoring process is executed by the host computer system, placing the full burden of access verification and control on the host computer system. For example, such approaches rely on the host computer system, rather than the DSDs, to identify which computer program is attempting to access which namespace and determine whether the computer program is allowed to do so.

The above access control approaches exhibit further disadvantages. First, those access control approaches may become ineffective in scenarios where the host computer system cannot use the namespace-to-computer program mapping information (e.g., due to its own limitations), or where all computer programs on the host computer system are associated with the same namespace. Second, such access control approaches are vulnerable if a malicious/compromised computer program disguises itself as an authentic computer program to obtain data access to the DSD. For example, a rogue/comprised social media computer program can change its attributes to match with that of a banking computer program, thereby deceiving the host computer program into regarding it as a genuine banking computer program and leading to unauthorized access.

Furthermore, compromised computer programs may deceive the host computer system that it is accessing the data to which the user has provided access, but once the access request packet reaches the lower-level drive, the access request packet may be modified by another malicious program to access a different logical location in the storage. The existing data access control approaches fail to prevent the DSDs from the possibility of in-transit request packets being manipulated.

Disclosed herein are methods and systems for assessing a data access request to a data storage device (DSD) by a computer program that ameliorate one or more of the aforementioned drawbacks, or any other drawbacks of the prior art, or that at least provide a useful alternative.

Overview

Figure 1A:
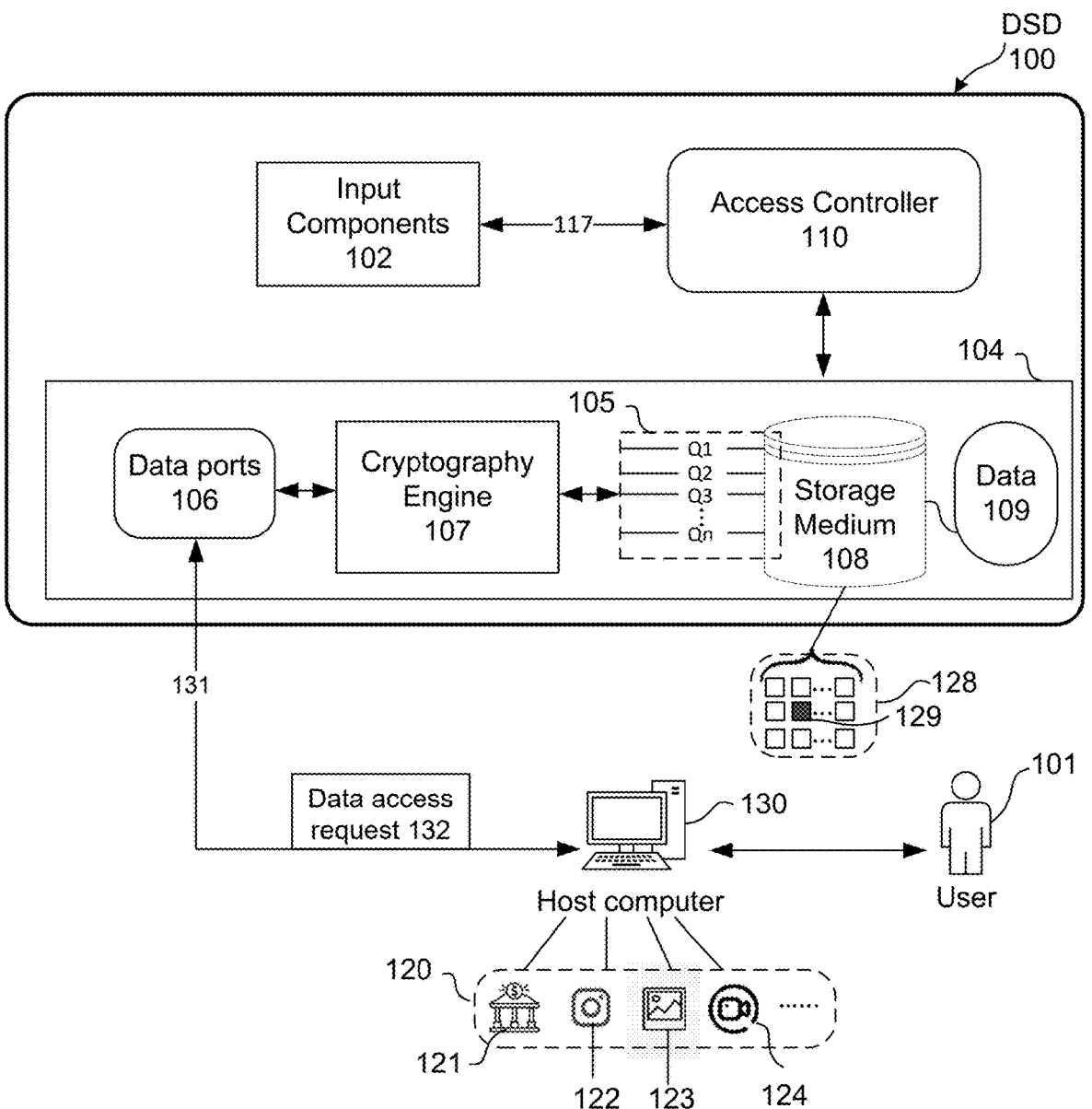
FIG. 1a illustrates an example data storage device (DSD) according to one embodiment.
Figure 1B:
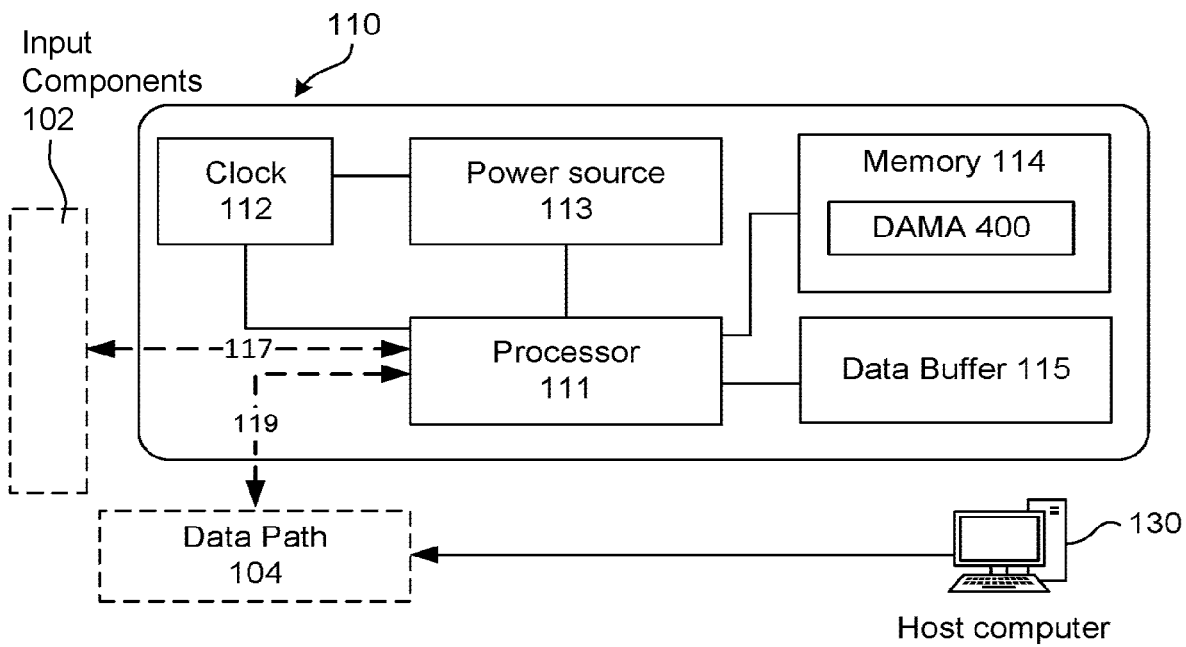
FIG. 1b illustrates a block diagram of an access controller of the DSD according to one embodiment.
Figure 1C:
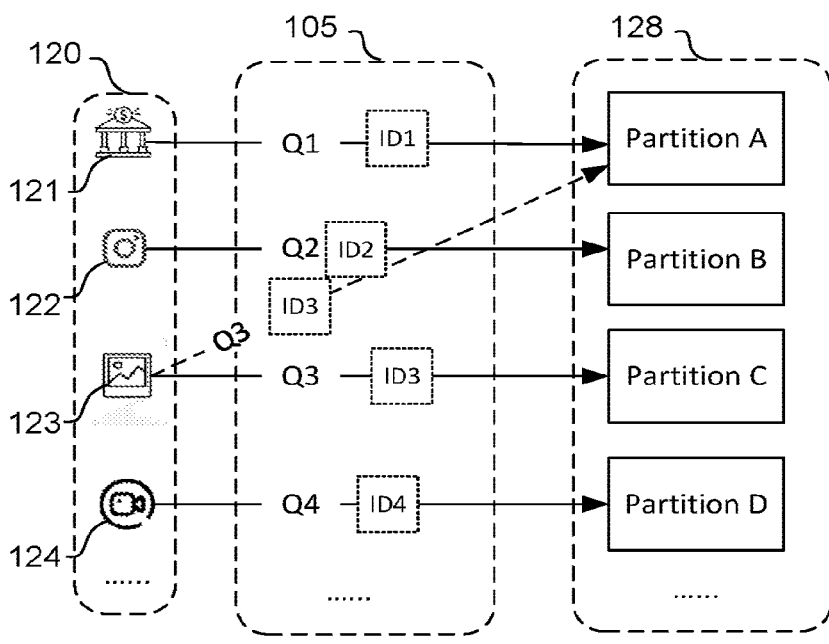
FIG. 1c illustrates an example of each computer programs of a plurality of computer programs configured to authentically access one partition of a plurality of partitions of a non-volatile storage medium of the DSD using one queue of a plurality of queues assigned to that computer program and corresponding to that one partition, according to one embodiment.
Figure 3A:
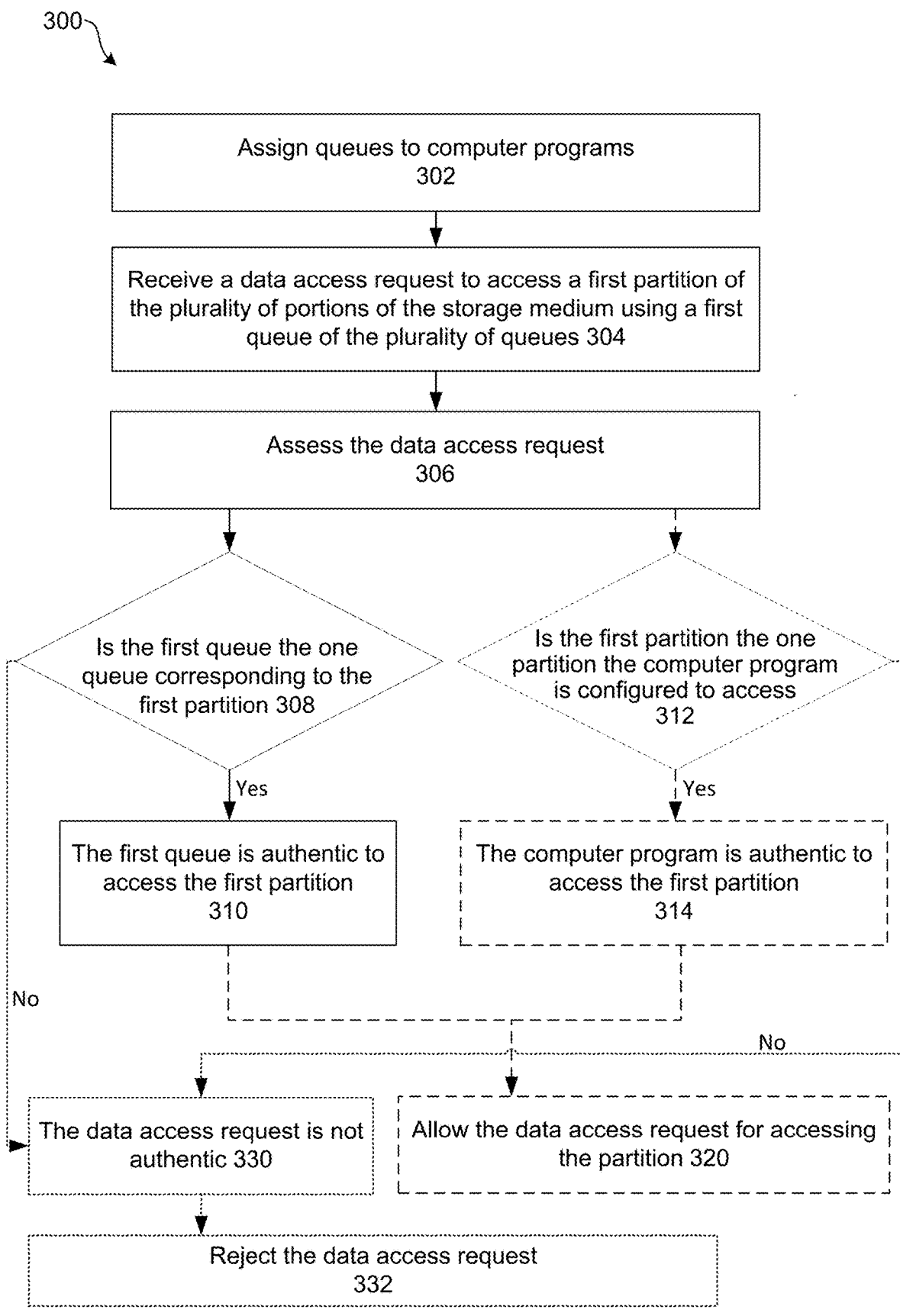
FIG. 3a is a flow diagram of a process for assessing a data access request to the DSD by a computer program according to one embodiment.

FIG. 3a illustrates a method 300 for assessing a data access request 132 to a data storage device (DSD) 100 by a computer program. FIGS. 1a to 1c illustrates an example DSD 100 and a system for implementing the method 300, comprising a plurality of computer programs 120 on a host computer system 130, a storage medium 108 of the DSD 100 comprising a plurality of partitions 128 that store user content data 109, an access controller of the DSD 100, a data path 104 configured to transmit at least data between the storage medium 108 of the DSD 100 and a host computer system 130.

The method 300 comprises assigning 302 a plurality of queues 105 to the plurality of computer programs 120. Each queue of the plurality of queues 105 is configured to transmit one or more structured and managed sequences of commands (e.g., access request 123) for communication between the host computer system 130 and the DSD 100. Through the assignment step 302, each computer program of the plurality of computer programs 120 is configured to transmit data to or receive data from the DSD 100 using a corresponding queue of the plurality of queues 105.

The storage medium 108 of the DSD 100 is segregated into a plurality of partitions 128, where different partitions are configured to store user content data 109 used by different computer programs 120. The storage medium 108 is typically non-volatile. Further, each computer program 120 is configured to authentically access one partition of the plurality of partitions 128. In an example shown in FIG. 1c, banking computer program 121, social media computer program 122, photo management computer program 123 and video computer program 124 are configured to authentically access Partition A, Partition B, Partition C and Partition D, respectively. In this example, the photo management computer program 123 is not configured to authentically access Partition A, which is configured to store the private financial data of a user 101.

Step 302 establishes a corresponding relationship of the plurality of computer programs 120, the plurality of queues 105, and the plurality of partitions 128 of the non-volatile storage medium 108. That is, each computer program 120 (e.g., a banking computer program 121) is configured to authentically access one partition (e.g., Partition A) of the plurality of partitions 128 using one queue (e.g., Queue 1 (Q1)) of the plurality of queues 105 assigned to that computer program 120 (e.g., the banking computer program 121) and corresponding to that one partition (e.g., Partition A).

Referring to FIGS. 1a, 1c and 3a, the method 300 also comprises receiving 304, from the computer program, a data access request 132 to access a first partition 129 of the plurality of partitions 128 (which may be any partition of the partitions 128) using a first queue of the plurality of queues 105 (which may be any queue of the queues 105). The data access request 132 may include requests to read, write, modify and/or delete data stored in the storage medium 108.

The method 300 further comprises assessing 306 the data access request 132. Assessing 306 the data access request 132 includes determining 308 whether the one queue (e.g., Q1) of the plurality of queues 105 corresponding to the first partition 129 (e.g., Partition A) is the first queue (e.g., Queue 1 (Q1), Queue 2 (Q2), Queue 3 (Q3), Queue 4 (Q4), . . . , or Queue n (Qn)).

On the one hand, in response to determining the one queue of the plurality of queues 105 corresponding to the first partition is the first queue, the DSD 100 determines 310 that the first queue is authentic to assess the first partition. On the other hand, in response to determining the one queue of the plurality of queues 105 corresponding to the first partition is not the first queue, the DSD 100 determines that the first queue is not authentic to assess the first partition.

For example, referring to an example shown in FIG. 1c, in the case where the DSD 100 receives the data access request 132 (from the banking computer program 121) to access the first partition (Partition A) using the first queue (Q1), since the one queue (Q1) corresponding to the first partition (Partition A) is the first queue (Q1), the DSD 100 determines that first queue (Q1) is authentic to assess the first partition (Partition A).

By contrast, in another example as shown in FIG. 1c, in the case where the DSD 100 receives the data access request 132 (from the photo management computer program 123) to access the first partition (Partition A) using the first queue (Q3), since the one queue (Q1) corresponding to the first partition (Partition A) is not the first queue (Q3), the DSD 100 determines 330 that the first queue (Q3) is not authentic to assess the first partition (Partition A).

The data storage devices and methods disclosed herein are advantageous in that the DSD is enabled to assess data access to its storage medium at its lower-level drivers despite any pre-configured privilege of the user and/or computer programs, and in addition to any access control approach executed by the host computer system. The disclosed method and DSD provide the DSD with an additional layer of security against unauthorized data access, particularly in an environment with the implementation of multiple computer programs, enabling the DSD to directly assess and control access to its storage medium.

The disclosed methods and data storage devices efficiently detect unauthorized/malicious access requests downstream by determining whether a queue to access a partition of the storage medium is authentic. The assessment of data access requests is typically seamless without introducing any latency. For example, to complete a seamless assessment process 306, a session can be established and activated between the communicating computer program and the DSD 100 before the access of any data.

By implementing the disclosed method, the DSD is unlikely to be compromised, as it is generally challenging to hack the lower-level drivers of the DSD. For example, any compromised computer programs running in the host computer system 130 can be detected by method 300 through the assessment process 306. Further, any computer program on the host computer will not have full access to all the data saved on the storage medium 108 owing to the use of partitions.

Data Storage Device (DSD)

FIG. 1a shows an embodiment of the DSD 100 comprising a data path 104 and an access controller 110 (also referred to as the controller). The access controller 110 may be comprised of one or more processors. A processor may comprise one or more microprocessors, microcontrollers or controlling circuitry. The one or more processors of the access controller 110 are, in combination or individually, configured to execute program code stored within the system memory 114 to issue commands for controlling the operation of the DSD 100.

The data path 104 comprises a data port 106 configured to transmit data between a host computer system 130 and the DSD 100 (e.g., via a data flow 131). The DSD 100 is configured to register with the host computer system 130 such as to provide functionality to the host computer system 130 of a block data storage device. In some embodiments, the data port 106 includes control operations to translate interface protocols, and to provide other general device functionality.

The DSD 100 is connected to a host computer system 130, which may be a desktop or laptop computer, a tablet computer, a mobile phone, a server (e.g., for a data center), or any other smart device or system that can execute a plurality of computer programs 128. Based on the application scenario, a DSD 100 may either be the primary or secondary DSD of the host computer system 130.

The DSDs 100 may be configured to connect to conventional full-scale computing devices, such as computer workstations and servers, by the use of adapters or similar components. Alternatively, the DSDs 100 may be attached to computing devices in a fixed or non-removable way (e.g., as soldered onto one or more pinouts of a printed circuit board (PCB) or other internal part of the computing system).

In some embodiments, a plurality of computer programs 120 are installed on and/or executed by the host computer system 130. The plurality of computer programs 120 may be of various types, including but not limited to banking/financial computer program 121 (e.g., PayPal), social media computer program 122 (e.g., Meta and Instagram), graphics and photo management computer program 123 (e.g., Photos App), video computer program 124 (e.g., YouTube), communication computer program (e.g., WhatsApp and Zoom)

and document management and processing computer program (e.g., Microsoft Office and Adobe Acrobat). The plurality of computer programs 120 may be executed on one or more software operating systems (e.g., Windows, Linux, macOS, DOS, Unix, IOS and Android) implemented on the host computer 130 depending on the characteristics of the host computer 130 and the needs of user 101.

In some embodiments, the data path 104 comprises a plurality of queues 105, wherein each queue is configured to one or more transmit structured and managed sequences of commands between the host computer system 130 and the DSD 100. The plurality of queues 105 enables simultaneously and/or asynchronously processing of data received from either the host computer system 130 or the DSD 100, which can significantly improve the throughput, reliability and scalability of data transmission of the DSD 100.

In some embodiments, the plurality of queues 105 include multiple I/O queue pairs. In one embodiment, each queue pair includes an I/O submission queue configured to transmit commands from the host computer system 130, and an I/O completion queue configured to transmit commands from the access controller 110 of the DSD 100. In one embodiment, multiple I/O submission queues are associated with a single I/O completion queue in the case where a single worker thread processes all command completions via one I/O completion queue, even in the case where those commands originated from multiple I/O submission queues.

In some embodiments, the I/O completion queue can dynamically change and need not be fixed when a computer program 120 is accessing the DSD 100. In such scenarios, the I/O queue pairs are formed with all possible combination of submission and completion queues. In one embodiment, the I/O submission queue is restricted but the completion process can happen via any of the available I/O completion queues.

In this disclosure, each I/O queue pair is also referred to as a "queue" to define one data transmission path of a plurality of data transmission paths between the host computer system 130 and the DSD 100. In one embodiment, the DSD is a Non-Volatile Memory Express (NVMe) device that has 64K I/O queues supporting up to 64K commands.

In some embodiments, the DSD 100 is configured to provide functionality to the host computer system 130 of a block data storage device. The DSD 100 comprises a storage medium 108 to store user content data 109. The user content data 109 includes one or more blocks of data organized into files, for example including images, documents, videos, etc., according to a particular file system operable by the host computer system 130.

In some embodiments, the user content data 109 may be accessed (e.g., read, written, modified or deleted) by the computer programs 120. For example, a photo management computer program 123 may access one or more blocks of data for images, and a bank computer program 121 may access one or more blocks of data for financial information of the user 101.

The DSD 100 includes a cryptography engine 107 configured to receive, interpret and execute commands received from host computer system 130 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI), NVMe, I2C, and other proprietary architectures.

The commands received from the host computer system 130 may include data access request 132 to the storage medium 108 of the DSD 100. The data access requests include requests to read, write, modify and delete one or more blocks of data. In some embodiments, the cryptography engine 107 is connected between the data port 106 and the storage medium 108 and is configured to use a cryptographic key to encrypt user content data 109 to be stored in the storage medium 108, and to decrypt the encrypted user content data 109 stored in the storage medium 108 in response to a request from the host computer system 130.

The storage medium 108 is non-transitory such as to retain the stored block data irrespective of whether the medium 108 is powered. The medium 108 may be a hard disk drive (HDD) with a rotating magnetic disk or a solid state drive (SSD) and its variations like Serial ATA (SATA), mini SATA (mSATA), M.2 and NVMe, combinations of the above such as SSHD, or any other non-volatile storage media. Further, the storage medium 108 may be a block data storage medium, which means that the user content data 109 is written in blocks to the storage medium 108 and read in blocks from the storage medium 108.

In some embodiments, the storage medium 108 is segregated into a plurality of partitions 128 where different partitions (e.g., Partition A, Partition B, Partition C and Partition D) store different user content data 109 used by various computer programs 120. In some embodiments where the DSD is a block data storage device, each partition may include multiple blocks for the reading, writing and/or modification of user content data 109 stored in that partition. Different partitions may have either the same or different number of logical blocks. In some embodiments, each partition comprises one or more logical addresses and a physical address enabling the computer programs 120 and DSD to direct the partition.

In some embodiments, the plurality of partitions 128 are created within the DSD 100 based on the data access by specific queues. For example, data from Queue 1 (Q1) can be stored in Partition A. Once data from Queue 2 arrives, a new Partition B may be created. Before creating the plurality of partitions for each queue, the host computer system 130 may inform the DSD 100 if the host computer system 130 intends to enable the disclosed method 300 for the data currently being written to the drive. In some embodiments, a new partition shall not be created, if multiple queues are assigned to a computer program 120. For example, the host computer system 130 may write data belonging to the banking computer program 121 to the DSD 100 using Queue 1 (Q1) and Queue 25 (not shown in the drawings). In this case, the entire data set from the banking computer program 121 will be stored in a single partition (e.g., Partition A) of the storage medium 108.

In some examples, the DSD 100 includes one or more input components 102 configured to accept an input from the user 101. The input components 102 may include a keypad 105, or a similar arrangement of mechanical components that collectively enable the selection of digits or characters for the purpose of forming one or more input credentials and entering the one or more credentials into the DSD 100 for one or more authentication processes. The input components 102 may also include one or more communications devices, such as a wireless modem, configured to receive and transmit data wirelessly via the transmission of electronic messages in a predetermined form. For example, this enables the DSD 100 to receive input data, such as configuration data for computer programs 120, from an external device of a user 101.

The access controller 110 controls access of the user 101 to the user content data 109 based on the assessment of data access requests. FIG. 1b illustrates an exemplary embodiment of the access controller 110, which includes: a processor 111; a clock 112 in communication with the processor 111; memory modules in the form of a system memory 114 and data buffer 115 configured to exchange data with the processor 111 and to store the data from the host computer system 130 temporarily; and a power source 113 in the form of an internal battery configured to power to supply power exclusively to components of the access controller 110. Data flows 117 and 119 exist between the processor 111 and the input components 102 and the data path 104 respectively. The processor 111 is configured to execute program code stored within the system memory 114 to issue commands for controlling the operation of the DSD 100.

The system memory 114 further includes a data access management application (DAMA) 400 for assessing, authenticating or rejecting one or more data access requests 132 to the DSD 100. The DAMA 400 may be a microprogram executed by the access controller 110 to detect and process the access activities performed by a connected host computer system 130 based on the control commands and/or data passed through the data path 104 by the processor 111. Execution of the DAMA 400 thereby enables the DSD 100 to assess data access requests 132 by computer programs 120 on a host computer system 130 in real-time and to subsequently authenticate or reject the data access requests 132.

Assigning Queues to Computer Programs

As described earlier, at step 302, the DSD 100 assigns a plurality of queues 105 to a plurality of computer programs 120, wherein each computer program is configured to authentically access one partition of a plurality of partitions 128 of the non-volatile storage medium 108 of the DSD 100 using one queue of the plurality of queues 105 assigned to that computer program and corresponding to that one partition.

Referring to FIG. 1c, exemplified computer programs, i.e., the banking computer program 121, social media computer program 122, photo management computer program 123 and video computer program 124 are respectively configured to authentically access Partition A, Partition B, Partition C and Partition D using Queue 1 (Q1), Queue 2 (Q2), Queue 3 (Q3) and Queue 4 (Q4), respectively. It should be understood that the plurality of computer programs 130, queues and partitions are not limited to those shown in FIG. 1c.

Through step 302, each computer program would not access the DSD 100 using a queue not assigned to that computer program and cannot access a partition of the non-volatile storage medium 108 that does not correspond to that computer program. In one example, if the photo management computer program 123 is compromised (e.g., hacked by a malicious party) and attempts to access Partition A that is configured to store data of the banking computer program 121, the photo management computer program 123 would use the assigned queue, i.e., Q3, rather than Q1 that is configured to access Partition A.

In some embodiments, whenever a computer program attempts to communicate to the DSD 100, a driver of the host computer system 130 ensures that data (e.g., packets) sent by the computer program will use the queue assigned for that computer program. For example, the driver will ensure that the photo management computer program 123 will use Q3 rather than Q1 that is supposed to be used by the banking computer program 121.

In further embodiments, different computer programs may have access to a single partition. Provided that the computer programs access the same partition using different queues, the data used by each computer program will remain isolated, preventing the sharing of data across different computer programs. For example, a first gaming software and a second gaming software may be configured to access the same partition of the storage medium 108 for storing user's gaming data. In another scenario, the social media computer program 122 may also have access to Partition C configured to store photos and graphics, together with the photo management computer program 123, to enable the user 101 to post photos and/or images to their social media.

In some embodiments, assigning 302 the plurality of queues 105 to the plurality of computer programs 120 is based on data characteristics of the computer programs 120. Specifically, the storage medium 108 may be segregated into multiple partitions 128 based on data characteristics of the data used by the computer programs 120. This can be completed by a joint pre-configuration process executed by the host computer 130 and the DSD 100 (e.g., at the access controller 110) based on a pre-configured understanding between the host computer 130, the computer programs 120 and the DSD 100. The configuration of partitions 128 can be either fixed or adaptable based on the specific requirements of the application scenario.

Furthermore, the configuration of partitions 128 can be updated to accommodate changes over time. For example, consider two different computer programs (e.g., a first software and a second software) accessing DSD 100, wherein the two software both belong to the social media category. The first software is configured to access Partition A via Queue 1, and the second software is configured to access Partition B via Queue 2. Under some scenarios, the host computer system 130 may determine that the data of the first software and the second software data can be shared with each other and that access restriction between the first software and the second software is no longer required. Accordingly, the host computer 130 may inform the DSD 100 to allow access to Partition A via Queue 2 in addition to Queue 1. Similarly, the host computer 130 may further inform the DSD 100 to allow access to Partition B via Queue 1 in addition to Queue 2.

The data characteristics may include the type of data a computer program is typically using. For example, multiple computer programs 123 in relation to the processing and management of photos, images and graphics may access the same partition (e.g., Partition C). Similarly, digital documents data such as Microsoft Word and Excel files, Notebook files and PDF files, used by document management and processing software use a single partition of the storage medium 108.

The data characteristics may also include a confidentiality of the data used by the computer program 120. The confidentiality of the data may also be associated with other data characteristics, such as the type of data the computer program is typically using. In some embodiments, the confidentiality of the user content data 109 is grouped into a plurality of levels. For example, the data used by the banking computer program 121 may be categorized as possessing "high confidentiality" due to the sensitive nature and critical importance of users' personal and financial information, as well as the severe consequences that may be caused by compromising such information. By contrast, the data used by the video computer program 124 may be categorized as having "medium confidentiality", as the data used by the video computer program 124, such as viewing records, are typically user-private but not as crucial as personal and financial information.

In some embodiments, one or more computer programs of the plurality of computer programs 120 having the same level of confidentiality, for example, a gaming program A and a gaming program B having "low confidentiality", may be configured to access the same partition (e.g., Partition E (not shown in the drawings)) of the storage medium 108. Partition E is typically different from the partition (e.g., Partition A) assigned to the banking computer program 121 whose data is grouped into "high confidentiality level".

In some embodiments, computer programs 120 using the same type of data or having the same level of confidentiality can also access different partitions. For example, classified as social media computer program 122, Instagram and TikTok may access different partitions of the storage medium 108, to increase the isolation of the user's data on different social media platforms. Similarly, banking and financial computer programs 121, which have the same level of confidentiality (e.g., high confidentiality), may access different partitions to ensure that the user's financial situation is not shared between different banks and online payment companies.

Figure 4:
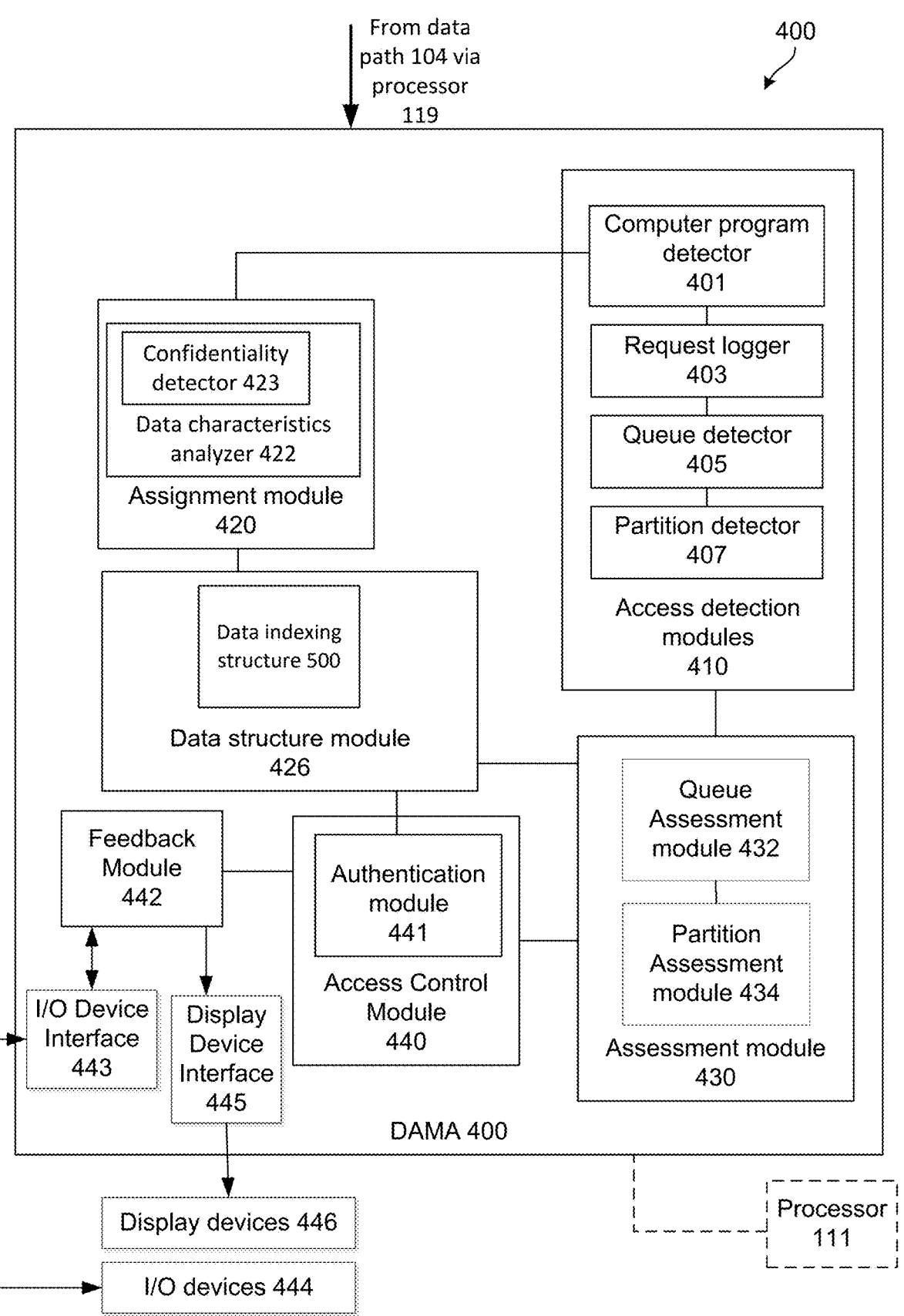
FIG. 4 is a block diagram of an exemplary configuration of a data access management application (DAMA) according to one embodiment.

Referring to FIG. 4 illustrating an exemplary configuration of the data access management application (DAMA) 400, an assignment module 420 may be configured to assign 302 the plurality of queues 105 to the plurality of computer programs 128. The assignment module 420 may be executed prior to receiving 304 a data access request 132 from a computer program.

In the described embodiments, the assignment module 420 comprises a data characteristics analyzer 422 configured to retrieve data characteristics of the data used by the computer programs, which enables assigning 302 the plurality of queues 105 to the plurality of computer programs 120 based on the data characteristics. The data characteristics analyzer 422 may retrieve data characteristics from the pre-configured information of the computer program, such as data structures, types, and variables used. The data characteristics analyzer 422 may also monitor the behavior of the computer program and generate features describing data characteristics.

In some embodiments, the data characteristics analyzer 422 may further include a confidentiality detector 423 configured to confidentiality of the data used by the computer program 120. The confidentiality detector 423 may group the user content data 109 into a plurality of levels. In one embodiment, each level of the plurality of levels indicates the extent of the confidentiality of the data, such as "high confidentiality", "medium confidentiality" and "low confidentiality".

In another embodiment, each level is a numerical threshold value quantifying the confidentiality. For example, the levels comprise "level 1", "level 2", . . . , and "level 9", where "level 1" indicates the lowest confidentiality (e.g., for the least sensitive data) and "level 9" indicates the highest confidentiality. The confidentiality detector 423 may further communicate the confidentiality information to the assignment module 420 to assist in assigning a plurality of queues 105 to a plurality of computer programs 120 based, at least partially, on confidentiality.

Figure 5A:
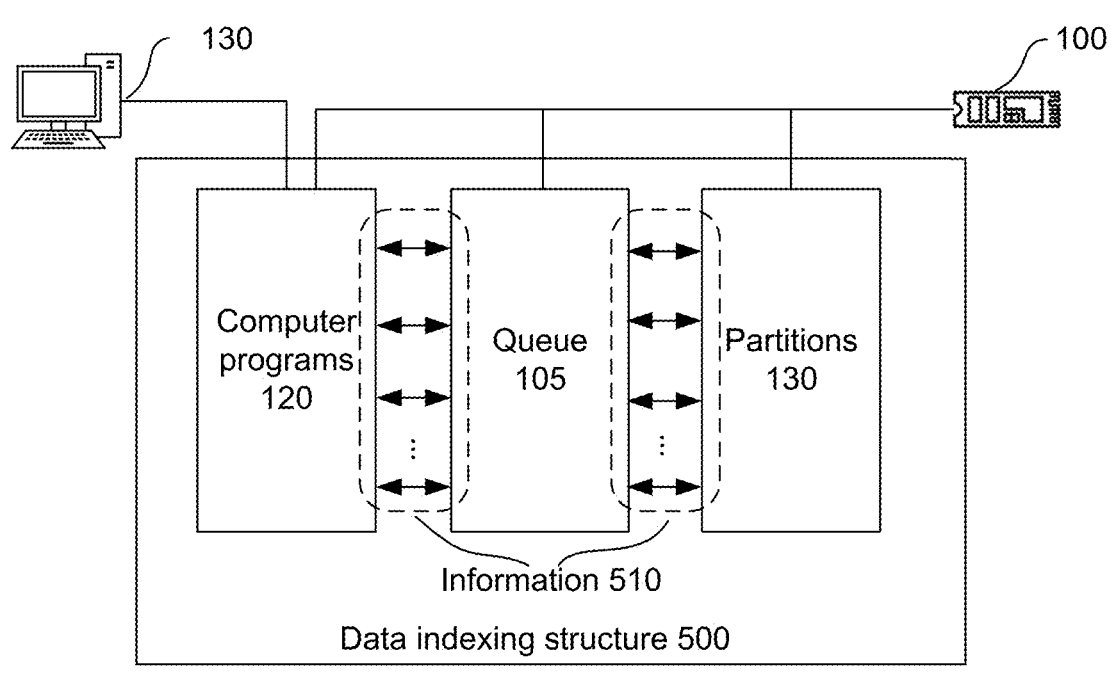
FIG. 5a is a block diagram of an exemplary configuration of the host computer system and the DSD using a data indexing structure for assigning the plurality of queues to the plurality of computer programs, according to one embodiment.
Figure 5B:
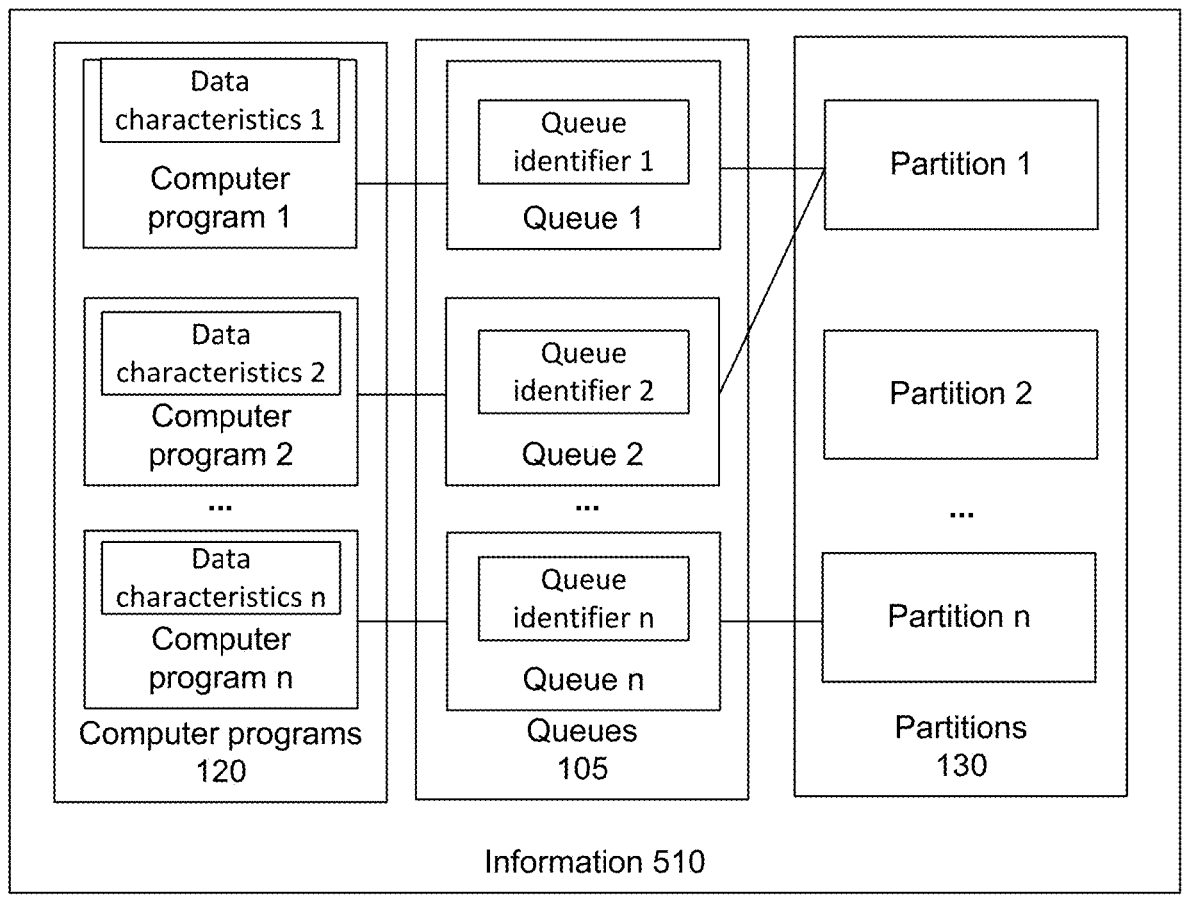
FIG. 5b is a block diagram of an exemplary configuration of the data indexing structure according to one embodiment.

In some embodiments, assigning 302 the plurality of queues 105 to the plurality of computer programs 120 comprises generating a data indexing structure 500 having information for each computer program 120, as shown in FIGS. 5a and 5b. Specifically, the data indexing structure 500 having information for each computer program 120, includes: (i) the one of the plurality of partitions that each computer program is configured to access; (ii) the one queue of the plurality of queues assigned to that computer program; and (iii) the one queue of the plurality of queues corresponding to the one of the plurality of partitions.

In the described embodiments, the data indexing structure 500 may be stored in the DAMA 400 of the system memory 114. For example, referring to FIG. 4, the data indexing structure 500 may be stored in a data structure module 426 of the DAMA 400 based on input from the assignment module 420. The data structure module 426 is configured to store, process, organize, maintain and/or update data in various forms such as array, stack, list, table, tree or any other data structure that is suitable to store data in relation to the data access management (e.g., assessment and control).

In some embodiments, the data indexing structure 500 includes a pre-specified mapping, as shown in FIG. 5b. The pre-specified mapping may be implemented in different forms, such as a table, a list or a data sheet. The pre-specified mapping may be stored in various document types such as Excel Workbook, XML, PDF, TXT and CSV. The data indexing structure 500 may further include logical addresses directing to each partition including one or more user data blocks.

In some embodiments, the data indexing structure 500 comprises information 510 for each computer program including the one of the plurality of partitions 128 that computer program is configured to access. For example, as shown in FIG. 5b, information 510 may include that Computer program 1 is configured to authentically access Partition 1. For each computer program, the information 510 may further comprise the one queue of the plurality of queues 105 assigned to that computer program. For example, referring to FIG. 5b, information 510 may include that Queue 1 and Queue 2 are respectively assigned to Computer program 1 and Computer program 2 to send data access requests 132 to the DSD 100.

The information 510 may further comprise the data characteristics (e.g., data characteristics 1, data characteristics 2 and data characteristics 3) of each computer program. As described earlier, the data characteristics may include the type of data a computer program typically uses, the confidentiality of the data used by the computer program, or any other characteristics. The information on data characteristics may be provided by the data characteristics analyzer 422.

The data indexing structure 500 having information 510 for each computer program may further include the one queue of the plurality of queues corresponding to the one of the plurality of partitions 128. For example, referring to FIG. 5b, information 510 also includes that both Queue 1 and Queue 2 correspond to Partition A.

In an example where the data indexing structure 500 is in the form of a mapping table, the corresponding relationship of a computer program, a queue and a partition, for example, Computer program n being configured to authentically access Partition n using Queue n, can be recorded in a row or column of the mapping table.

In some embodiments, each queue of the plurality of queues 105 comprises a queue identifier used by a driver of a host computer system 130 to assign one of the plurality of queues 105 to one of the plurality of computer programs 120. Typically, the queue identifiers are unique to ensure that each queue is distinctly recognized by its queue identifier. For example, the Queue identifier 1 (ID1), Queue identifier 2 (ID2), and Queue identifier n configured to respectively identify Queue 1, Queue 2, and Queue n are different from each other.

The queue identifiers can take various forms. In some embodiments, the queue identifiers may be in the form of a plurality of serial numerals, uniquely referring to each queue, such as 1, 10, 100, 1000, and so on. Alternatively, the queue identifiers may be in the form of an alphanumeric string including random numerals and/or characters (e.g., generated from hashing methods) to make the identifiers less predictable and more resistant to undesirable exposure. In implementations where such queue identifiers are used, even if the queue identifiers were obtained by a malicious third party, the corresponding queue associated with those queue identifiers in the form of random alphanumeric strings would remain obscure. This prevents the malicious party from easily decoding the queue associated with each computer program.

It should be understood that the above numerals of computer programs, queues and partitions, such as "1", "2" and "n", are merely used as signs and do not intend to specify any special order or corresponding relationship of the computer programs, queues and partitions.

In some embodiments, the indexing structure 500 may be updated to accommodate changes over time. For example, the computer programs 120 on the host computer system 130 may change over time, e.g., new computer program(s) being installed, or existing computer program(s) being updated/removed. Consequently, the queues 105 associated with the computer programs 120 may be updated to accord with such changes. In another example, a user 101 may decide to grant access to a particular computer program to access a partition that were not allowed for access by the computer program. For example, in the case a user 101 wants a second gaming software to access a partition (e.g., Partition E) used by a first gaming software to synchronize the user data, the indexing structure 500 may need to be updated to allow access to the partition (e.g., Partition E) via the queue assigned to the second gaming software.

The indexing structure 500 can be either updated automatically (e.g., periodically) or manually on user instructions (e.g., through a specific authentication process). The data structure module 426 may execute the updating process. In the cases where a pre-specified mapping is used, the updating process may include replacing one or more elements (e.g., rows/columns of a mapping table) of the pre-specified mapping.

In some embodiments, the DSD 100 is a non-volatile memory express (NVMe) device including a plurality of I/O queues (e.g., 64K I/O queues). Either all of the plurality of I/O queues or a selected subset of the plurality of I/O queues can be employed for the purposes of the disclosed method, i.e., for the access of different partitions 128 by different computer programs 105. In some embodiments where the selected subset of the plurality of I/O queues are used for the disclosed method, the other I/O queues shall not be used without further authentication by the DSD 100.

Receiving and Accessing Data Requests

Figure 2:
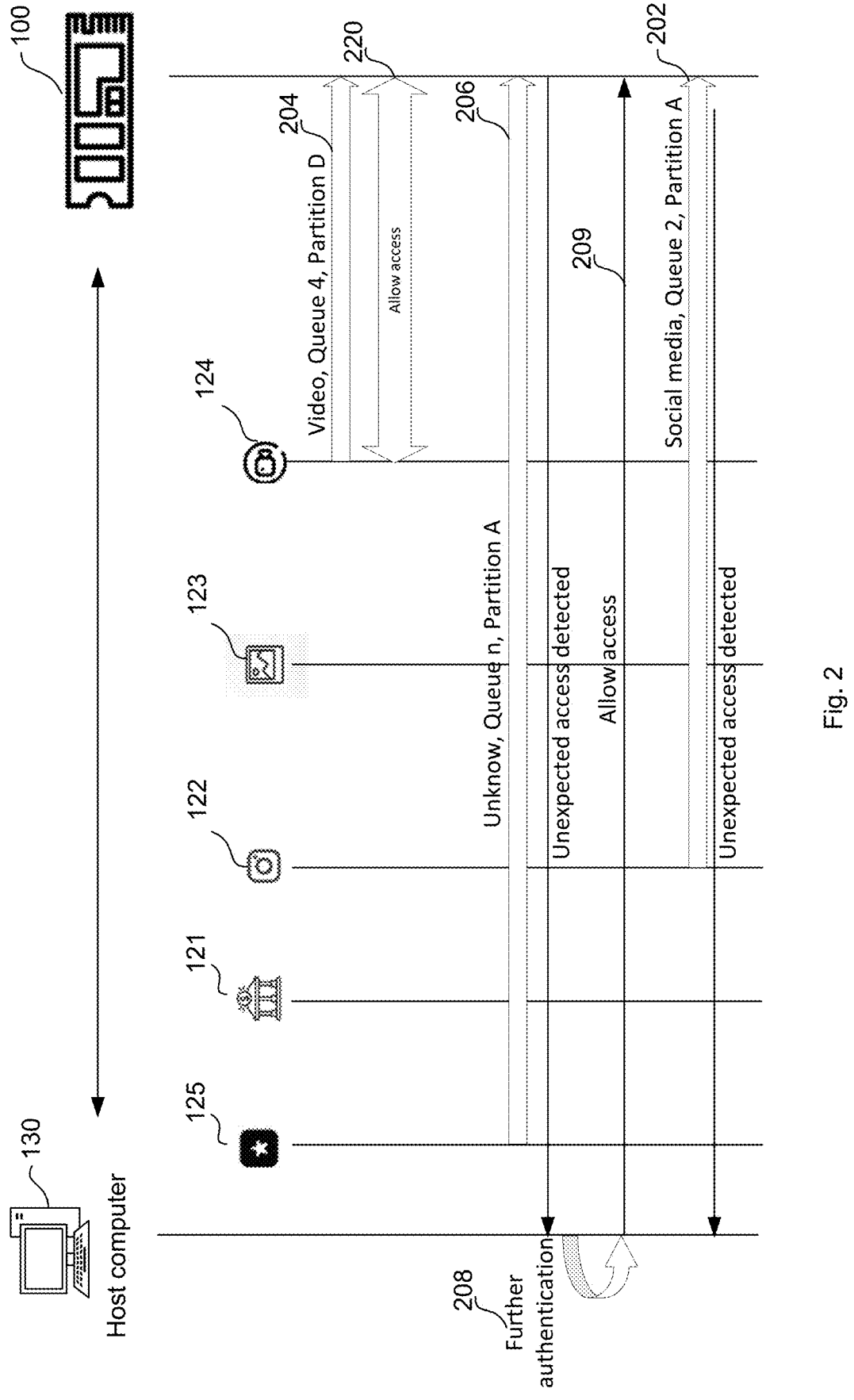
FIG. 2 illustrates an example of the DSD assessing data access requests by the plurality of computer programs on the host computer system, according to one embodiment.

As described earlier, at step 304, the DSD 100 receives, from a computer program, a data access request 132 to access a first partition 129 of the plurality of partitions 128 using a first queue of the plurality of queues 105. The first partition 129 can be any of the plurality of partitions 128, and the first queue can be any of the plurality of queues 105. FIG. 2 also shows the data access requests 202,204,206 from different computer programs 122,124,125 using Queue 2, Queue 4 and Queue n, respectively.

Referring back to FIG. 4, in the described embodiments, the access detection modules 410 of the DAMA 400 receives and/or processes the access requests of the connected host computer device 130 by processing the data stream 119 passed through the data path 104 in response to the host computer device 130 sending a data access request 132 to the DSD 100. Access detection modules 410 are adapted to process data stream 119 to generate data associated with the access requests receivable by the DAMA 400.

In the described embodiments, the access detection modules 410 include a computer program detector 401 configured to detect the computer program from which the DSD 100 receives the data access request 132. The access detection modules 410 also include a request logger 403 configured to recognize and/or decode one or more data access requests 132 in stream 119 from the host computer system 130. The access detection modules 410 further includes a queue detector 405 configured to detect an indication of the queue used for transmitting the data access request 132. In some embodiments, the queue detector 405 retrieves the queue identifier (e.g., Queue identifier 1, Queue identifier 2, . . . . Queue identifier n, etc.) of the queue. The detection modules 410 also include a partition detector 407 configured to detect an indication of the partition (e.g., a logical address) that the computer program attempts to access.

The method 300 further comprises step 306 for accessing the data access request 132 received from the computer program at step 304. Assessing 306 the data access request 132 includes determining 308 whether the one queue of the plurality of queues 105 corresponding to the first partition 129 that the computer program is attempting to access, as assigned by the DSD 100 in step 302, is the first queue that the computer program uses.

As a first example, as shown in FIG. 2, the DSD 100 receives a data access request 204 by a video computer program 124 to access a first partition (i.e., Partition D) of the plurality of partitions 128 using a first queue (i.e., Queue 4) of the plurality of queues 105. The DSD 100 then assesses 306 the data access request 204 to determine whether the one queue of the plurality of queues 105 corresponding to Partition D, as assigned in step 302, is actually the first queue (i.e., Queue 4). In the case where the queue corresponding to Partition D is Queue 4 (Q4), as shown in FIG. 1c, the DSD 100 determines that the one queue (i.e., Queue 4) corresponding to the first partition (i.e., Partition D) is the first queue (i.e., Queue 4) as shown in FIG. 2.

As a second example, the DSD 100 receives a data access request 202 by a social media computer program 122 to access a first partition (i.e., Partition A) using a first queue (i.e., Queue 2). The DSD 100 then assesses 306 the data access request 202 to determine whether the one queue of the plurality of queues 105 corresponding to Partition D, as assigned in step 302, is actually the first queue (i.e., Queue 2). In the case where the queue corresponding to Partition A is Queue 1 (Q1), as shown in FIG. 1c, the DSD 100 determines that the one queue (i.e., Queue 1) corresponding to the first partition (i.e., Partition A) is not the first queue (i.e., Queue 2) as shown in FIG. 2.

In response to determining that the one queue of the plurality of queues corresponding to the first partition 129 is the first queue, the DSD 100 determines 310 that the first queue is authentic to assess the first partition 129. Referring to FIG. 2, in the above first example, in response to the DSD 100 determining that the one queue (i.e., Queue 4) corresponding to the first partition (i.e., Partition D) is the first queue (i.e., Queue 4), the DSD 100 determines 310 that the first queue (i.e., Queue 4) is authentic to assess the first partition (i.e., Partition D). By contrast, in the above second example, in response to the DSD 100 determining that the one queue (i.e., Queue 1) corresponding to the first partition (i.e., Partition A) is not the first queue (i.e., Queue 2), the DSD 100 determines that the first queue (i.e., Queue 2) is not authentic to assess the first partition (i.e., Partition A).

Referring to FIG. 4, in the described embodiments, an assessment module 430 in the DAMA 400 is configured to perform the assessment step 306. The assessment module 430 retrieves data from the access detection modules 410 to obtain information regarding the computer program, the first queue, and the first partition in relation to the received data access request 132 recognized by the request logger 403.

The determination step 308 may be performed by a queue assessment module 432 of the assessment module 430. Specifically, the queue assessment module 432 may retrieve data from the queue detector 405 and the partition detector 407 for information on the first queue used for transmitting the data access request 132 and the first partition that the computer program attempts to access. The queue assessment module 432 then determines whether the one queue of the plurality of queues 105, as stored in the DAMA 400 (e.g., in the data structure module 426), corresponding to the first partition (e.g., as detected by the partition detector 407) is the first queue (e.g., as detected by the queue detector 405).

In some embodiments, assessing 306 the data access request 132 further comprises determining 312 whether the one of the plurality of partitions the computer program is configured to access is the first partition 129. In response to determining 312 the one of the plurality of partitions the computer program is configured to access is the first partition 129, the DSD determines 314 that the computer program is authentic to access the first partition 129.

The determination process 312 may include determining whether the one of the plurality of partitions the computer program is configured to access matches the first partition 129. This may include determining whether a first partition identifier (e.g., a first logical address) of the one of the plurality of partitions the computer program is configured to access is the same as a second partition identifier (e.g., a second logical address) of the first partition 129.

Referring to FIGS. 1c and 2 and following the first example discussed earlier, the DSD 100 further determines 312 whether the one of the plurality of partitions the video computer program 124 is configured to access (i.e., Partition D as shown in FIG. 1c) is the first partition (i.e., Partition D as shown in FIG. 2). In response to determining the video computer program 124 is configured to access (i.e., Partition D as shown in FIG. 1c) is the first partition (i.e., Partition D as shown in FIG. 2), the DSD 100 determines 314 that the video computer program 124 is authentic to access the first partition (i.e., Partition D).

By contrast, following the second example as discussed earlier, the DSD 100 further determines 312 whether the one of the plurality of partitions the social media computer program 122 is configured to access (i.e., Partition B as shown in FIG. 1c) is not the first partition (i.e., Partition A as shown in FIG. 2). In response to determining the social media computer program 122 is configured to access (i.e., Partition B as shown in FIG. 1c) is not the first partition (i.e., Partition A as shown in FIG. 2), the DSD 100 determines that the social media computer program 122 is not authentic to access the first partition (i.e., Partition A).

The determination step 312 may be performed by a partition assessment module 434 of the assessment module 430. Specifically, the partition assessment module 434 may retrieve data from the computer program detector 401 and the partition detector 407 for information on the computer program and the first partition that the computer program attempts to access. The partition assessment module 434 then determines whether the one of the plurality of partitions 128 the computer program (as detected by the computer program detector 401) is configured to access, as stored in the DAMA 400 (e.g., in the data structure module 426), is the first partition (as detected by the partition detector 405).

The method 300 may further comprise allowing 320 the data access request 132 for accessing the first partition in response to determining 310,314 both the first queue and the computer program are authentic to assess the first partition 129. Referring to the aforementioned first example and FIG. 2, the DSD 100 determines 310 that the first queue (i.e., Queue 4) is authentic to assess the first partition (i.e., Partition D) and that the video computer program 124 is authentic to access the first partition (i.e., Partition D). Therefore, the DSD 100 allows 220,320 the data access request 204 by the video computer program 124 for accessing the first partition (i.e., Partition D) of the storage medium 108. Allowing 220,320 the data access request 132 for accessing the first partition may include allowing the computer program to read, write to, modify and/or delete data in the first partition of the storage medium 108 based on the data access request recognized and/or decoded by the request logger 403.

In some embodiments, referring back to FIG. 3a, in response to determining the one queue of the plurality of queues 105 corresponding to the first partition is not the first queue and/or the one of the plurality of partitions 128 the computer program is configured to access is not the first partition, the method 300 further comprises determining 330 the data access request is not authentic. In response to determining the data access request is not authentic, the method 300 further comprises rejecting 332 the data access request 132.

In the described embodiments, allowing 320 or rejecting 332 the data access request 132 is performed by the access control module 440 connected to the assessment module 430. Specifically, the access control module 440 may receive one or more indications of the determination results regarding whether the data access request is authentic or not.

In some embodiments, in response to determining the data access request is authentic, the authentication module 441 provides further instructions to the processor 111 of the DSD 100 to allow and execute the data access by the computer program. This may include the processer 111 further executing the data access request 132 temporarily stored in the data buffer 115.

In some embodiments, in response to determining the data access request is not authentic, the access control module 440 rejects the data access request 332. This may include the access control module 440 communicating with the proces- ser 111 to stop executing the data access request 132 and/or delete the data access request 132 that is temporarily stored in the data buffer 115.

The access control module 440 may further communicate with other elements of the DAMA 400 (e.g., a feedback module 442) to further inform 331 the user 101 of the data access request that is determined not authentic by the DSD 100. For example, the access control module 440 may input information regarding the data access request not being authentic to the feedback module 442 that is in connection with an I/O device interface 443 and/or a display device interface 445. The feedback module 442 may generate data in various types for generating different types of information such as text, graphics, sound and light, to be delivered to the user 101 at step 331.

The I/O device interface 443 provides functionality enabling the user 101 to interact with the DSD 100 via one or more I/O devices 444 such as a mouse and keyboard. Other external user input devices that may be connected include a microphone, an IR remote control, camera, and gesture systems. The I/O device interface 443 also provides functionality for the DSD 100 to instruct output peripherals, which may include printers, audio devices, and imaging devices.

The display device interface 445 may include one or more dedicated graphics interfaces, which transmit graphics and video signals between the DSD 100 and display devices 446. The display devices 446 may include hardware components that present information in visual form, such as monitors and displays.

In some embodiments, the I/O devices 444 and/or display devices 446 inform 331 the user 101 that the data access request 132 from the computer program is determined not authentic by the DSD 100. Specifically, the I/O devices 444 may output visual signals (e.g., images), sound signals (e.g., a specific warning sound) and/or light signals (e.g., a specific flash of light of the output peripherals) to the user 101.

The display devices 446 may display one or more indications for the unauthorized data access request, such as one or more visual indications, which may be in the form of patterns, images, signs and literal contents. The one or more indications for the unauthorized data access request may comprise information regarding the unauthorized data access request, including but not limited to: a notification or warning message to the user 101 for the unauthorized data access request (e.g., "an unexpected data access is detected" as shown in FIG. 2); details of the data access request (e.g., request type, such as read and write), the time the DSD 100 receiving the data access request, the computer program sending the data access request, the partition that the computer program attempts to access, the access privilege and/or security level of the computer program, and/or the characteristics of data (e.g., type and confidentiality level) used by the computer program.

In some embodiments, determining 308 whether the one queue of the plurality of queues 105 corresponding to the first partition 129 is the first queue and/or determining 312 whether the one of the plurality of partitions 128 the computer program is configured to access is the first partition 129 comprises retrieving information from the data indexing structure 500. For example, at the determination steps 308 and 312, the assessment module 430 may retrieve information from the data indexing structure 500 maintained by the data structure module 426. The information includes the one queue of the plurality of queues 105 corresponding to the first partition 129 (for step 308) and/or the one of the plurality of partitions 128 the computer program is config- ured to access (for step 312).

In some embodiments, the assessment module 430 may first provide i) information on the computer program (re- ceived from the computer program detector 401) and/or ii) information on the first partition 129 that the data access request 132 attempts to access (received from the partition detector 407) to the data structure module 426. The assess- ment module 430 may then search for information in rela- tion to that computer program and/or the first partition in the data indexing structure 500. The assessment module 430 may then retrieve information on the one partition that the computer program is configured to access and/or the one queue corresponding to the first partition 129.

In some embodiments, the indexing structure 500 includes a pre-specified mapping in the form of a mapping table, and the assessment module 430 may search for the specific columns/rows in relation to the computer program and/or the first partition. The assessment module 430 may then retrieve information on the one partition that the computer program is configured to access from a cell in those columns/rows and/or information on the one queue corresponding to the first partition 129.

Figure 6A:
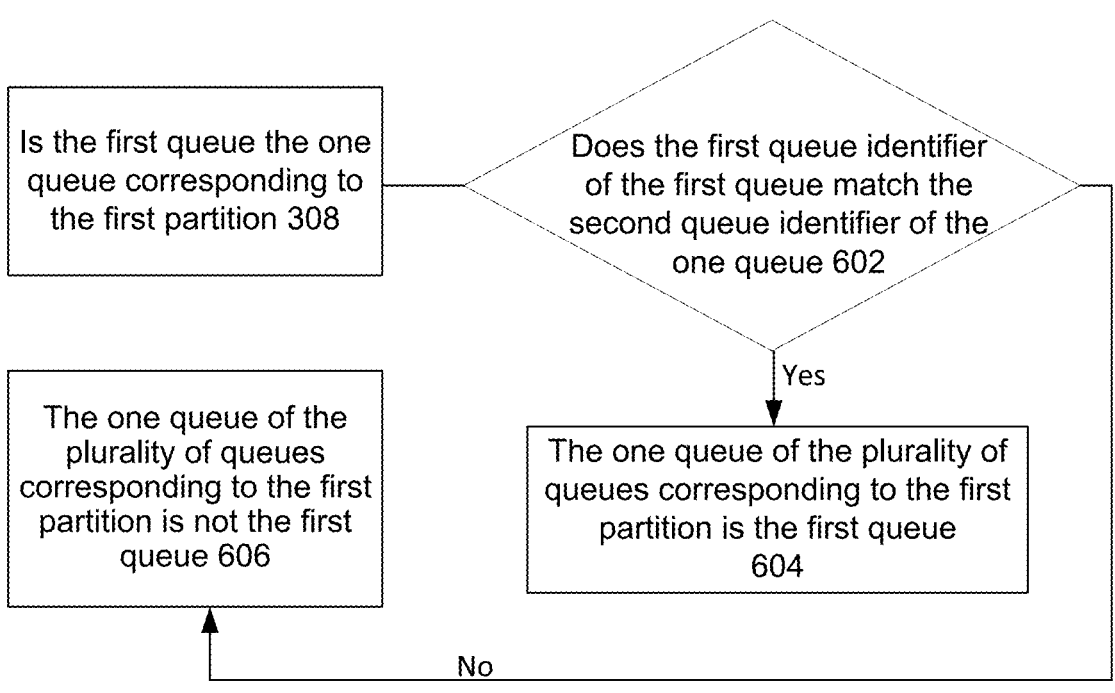
FIG. 6a is a flow diagram of determining whether the one queue of the plurality of queues corresponding to the first partition is the first queue, according to one embodiment.

Referring to FIG. 6a, in some embodiments, determining 308 whether the one queue of the plurality of queues 105 corresponding to the first partition is the first queue includes determining 602 whether a first queue identifier of the first queue matches a second queue identifier of the one queue of the plurality of queues 105 corresponding to the first partition. In response to determining 604 that the first queue identifier matches the second queue identifier, the DSD 100 determines that the one queue of the plurality of queues 105 corresponding to the first partition is the first queue. Determining 604 whether the first queue identifier matches the second queue identifier may be based on one or more pre-determined comparison rules. The determination process 604 may be performed by one or more comparison modules of the queue assessment module 432.

In some embodiments, the first queue identifier matching the second queue identifier includes that the first queue identifier is the same as the second queue identifier. For example, "5D2cA9" as a first queue identifier matches the second queue identifier "5D2cA9". In further embodiments, the first queue identifier matching the second queue identifier includes that the first queue identifier is sufficiently the same as the second queue identifier. For example, "5D2cA9" or "125" as a first queue identifier may be considered as matching the second queue identifier "5D2CA9" or "0125", respectively.

In the described embodiments, referring to FIGS. 1c, 2 and 4, the queue assessment module 432 performs assessment 306 of the data access request 204 by the video computer program 124 to access the first partition (i.e., Partition D) using the first queue (i.e., Queue 4). The queue assessment module 432 may retrieve, from the data indexing structure 500, the first queue identifier (i.e., ID4) of the first queue (i.e., Queue 4) detected by the queue detector 407. The queue assessment module 432 may further retrieve, from the data indexing structure 500, the second queue identifier of the one queue corresponding to the first partition (i.e., Partition D) detected by the partition detector 407. As in the example, the one queue corresponding to the first partition (i.e., Partition D) is Queue 4, the queue assessment module 432 will retrieve the second identifier ID4 and determine that the first identifier matches the second identifier, for example, by one or more comparison modules of the queue assessment module 432. The queue assessment module 432 may then determine 604 that the one queue corresponding to the first partition is the first queue, as the first identifier matches the second identifier.

In a different example, referring to FIGS. 1c, 2 and 4, the queue assessment module 432 also performs assessment 306 of the data access request 202 by the social media computer program 122 to access the first partition (i.e., Partition A) using the first queue (i.e., Queue 2). The queue assessment module 432 may retrieve, from the data indexing structure 500, the first queue identifier (i.e., ID2) of the first queue (i.e., Queue 2) detected by the queue detector 407. The queue assessment module 432 may further retrieve, from the data indexing structure 500, the second queue identifier of the one queue corresponding to the first partition (i.e., Partition A) detected by the partition detector 407. In the example, the one queue corresponding to the first partition (i.e., Partition A) is Queue 1 and accordingly, the queue assessment module 432 will retrieve the second identifier ID1, which is different from the first identifier ID2. As a result, the queue assessment module 432 determines that the first identifier does not match the second identifier and, accordingly, determines 606 that the one queue corresponding to the first partition is not the first queue.

In a further example, in FIG. 2, an unknown computer program 125 may send a data access request to the DSD 100 to access a first partition (i.e., Partition A) of the storage medium 108. As the computer program 125 was previously unknown to the DSD 100 and the host computer system 130, it may not have been assigned to a queue to access the storage medium 108. Therefore, a driver may select a temporary queue (i.e., Queue n) that has not been assigned to other computer programs for the data access request by the unknown computer program 125. The temporary queue may have a queue identifier IDn (not shown in FIG. 2). In this case, the queue assessment module 432 may retrieve, from the data indexing structure 500, the first queue identifier (i.e., IDn) of the first queue (i.e., Queue n) detected by the queue detector 407. The queue assessment module 432 may further retrieve, from the data indexing structure 500, the second queue identifier (i.e., ID1) of the one queue corresponding to the first partition (i.e., Partition A) detected by the partition detector 407. Accordingly, the queue assessment module 432 determines that the first identifier IDn does not match the second identifier ID1 and, therefore, determines 606 that the one queue corresponding to the first partition is not the first queue.

Additional Authentication Process

Figure 3B:
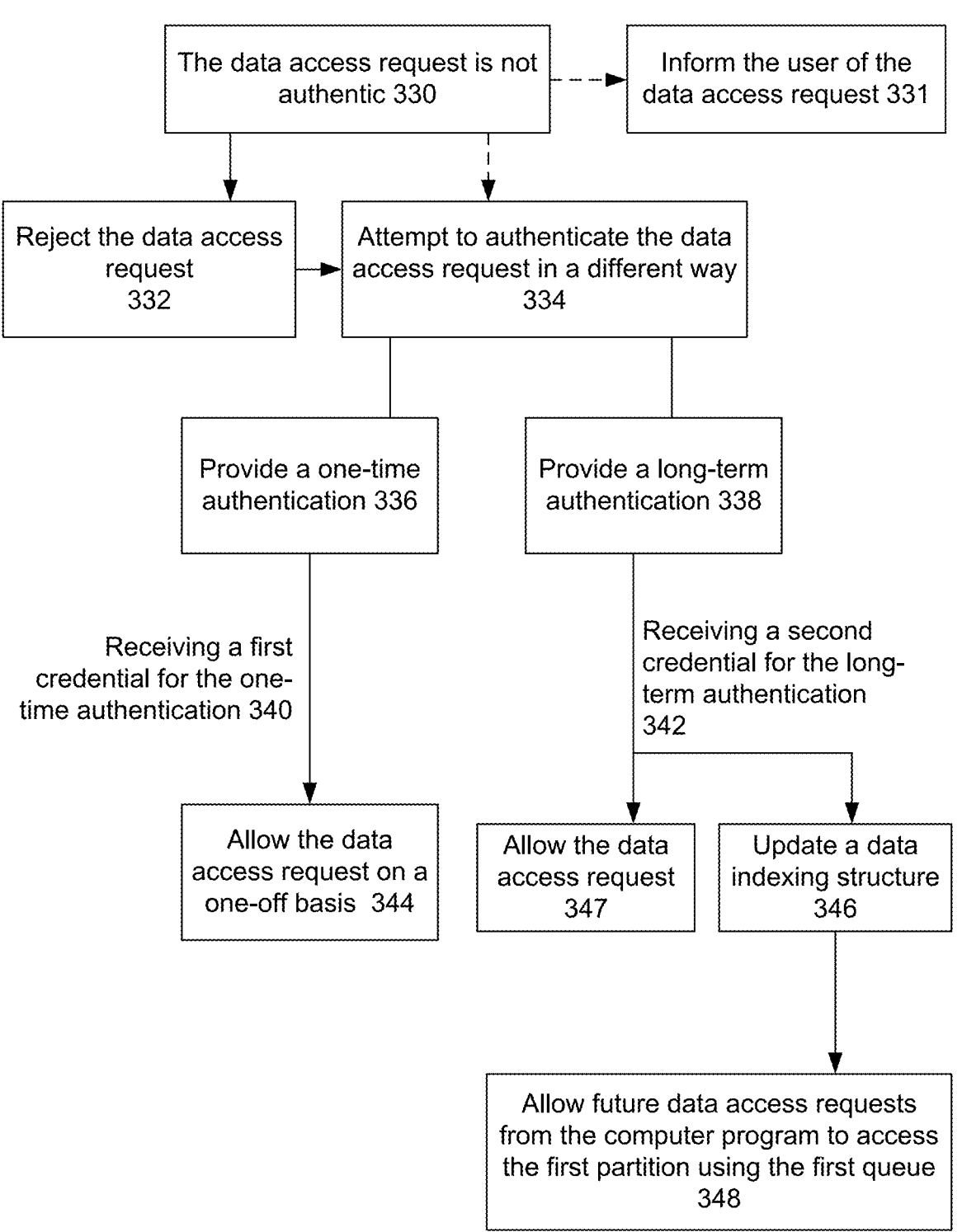
FIG. 3b is a flow diagram of a process performed by the DSD in response to determining the data access request is not authentic, according to one embodiment.

Referring to FIG. 3b, the method 300 further comprises in response to determining 330 the data access request is not authentic, attempting 334 to authenticate the data access request 132 in a different way.

For example, as shown in FIG. 2, the DSD 100 determines that the one queue corresponding to the first partition (i.e., Queue 1) is not the first queue (i.e., Queue n) used by the unknown computer program 125. Accordingly, the DSD 100 determines 330 that the data access request is not authentic. In response to the DSD 100 determining that the data access request is not authentic, the DSD 100 attempts 334 to authenticate the data access request 206 in a different way by providing one or more further authentications 208 to the host computer 130.

Referring back to FIG. 3b, the attempting 334 to authenticate the data access request a different way may include providing 336 a one-time authentication for the data access request 132; and/or providing 338 a long-term authentication to authenticate the computer program to access the first partition using the first queue.

The above one-time authentication or the long-term authentication may take various forms, including but not limited to: one or more password authentication, two-factor or multi-factor authentication, biometric authentication using unique biological traits (e.g., fingerprints and facial recognition) of a user 101, and token-based authentication performed by a security computer program to generate time-based and/or encrypted security tokens for authentication.

In the described embodiments, the authentication processes 334 are performed by the authentication module 441 of the access control module 440. The authentication module

441 and the connected feedback module 442 may jointly generate one or more authentication requests to be presented by the one or more display devices 446 to the user 101 via the display device interface 445.

Referring to FIG. 3*b*, in response to providing 336 a one-time authentication for the data access request 132, attempting 334 to authenticate the data access request in a different way further includes receiving 340, from the user 101 of the host computer system 130, a first credential for the one-time authentication. Similarly, in response to providing 336 a one-time authentication for the data access request 132, attempting 334 to authenticate the data access request in a different way further includes receiving 340, from the user 101 of the host computer system 130, a second credential for the long-term authentication.

In the described embodiments, the authentication module 441 may generate one or more authentication requests seeking the first credential and/or the second credential. Through the feedback module 442 and the display device interface 445, the one or more authentication requests may be presented to the user 101 by the one or more display devices 446. For example, the user 101 may see a pop-up window on the monitor requesting them to provide the first credential and/or the second credential for the one-time authentication and/or the long-term authentication.

In response, the host computer system 130, controlled by the user 101, may perform authentication operations, such as input credential(s), through one or more I/O devices 444 (e.g., a keyboard and/or a mouse). Specifically, the user 101 may provide the first credential and/or the second credential to the DSD 100 by the one or more I/O devices 444. During this process, the one or more display devices 446 are at least configured to present the one or more input credentials visually to the user 101. The authentication operations performed by the host computer system 130 are then sent back to the authentication module 441 through the I/O device interface 443 and feedback module 442 for one or more further verification operations performed by the authentication module 441.

In the described embodiments, the one or more further verification operations performed by the authentication module 441 may include determining whether the input credential(s) match the first credential and/or the second credential stored in the system memory 114 and/or buffer 115. The authentication module 441 then performs a comparison operation on the data representations of each code to check whether the input credential(s) match with the first credential and/or the second credential. For example, the authentication module 441 may be configured to perform a digit-wise comparison between the input credential(s) and the first credential and/or the second credential, where the input credential(s) is determined to match the first credential and/or the second credential responsive to each digit is identical over the length of the codes. In response to the input credential(s) matching with the first credential and/or the second credential, the authentication module 441 determines that the first credential and/or the second credential is received from the host computer system 130.

The first credential and/or the second credential may take various forms, such as a static password, a time-based one-time passcode (TOTP), or a biometric trait. In most cases, the first credential and the second credential are different from each other to enhance the security. In some cases, the first credential and the second credential may be set as the same based on the user's preference. The first credential and/or the second credential may be updated over time to avoid potential security risks.

The method 300 may further comprise in response to receiving 340 the first credential, allowing the data access request 132 by allowing access to the first partition by the computer program on a one-off basis. That is, upon receiving the first credential, the DSD 100 may grant a temporary access permission specific to the allowed data access request by allowing the computer program to perform the operation (e.g., read, write, modify or delete) designated by the allowed data access request on the first partition using the first queue. However, receiving 340 the first credential does not establish any ongoing permission for the computer program to access the same first partition of the storage medium 108 using the same first queue. For example, the one-time authentication does not change the data indexing structure 500 of the data structure module 426, and the one-time authentication will not affect the further assessment process 306 performed by the assessment module 430.

The method 300 may further comprise in response to receiving 342 the second credential, updating 346 the data indexing structure 500. In the cases where the data indexing structure 500 is a specific mapping, the updating process 346 may be adding one or more items to the specific mapping.

Figure 6B:
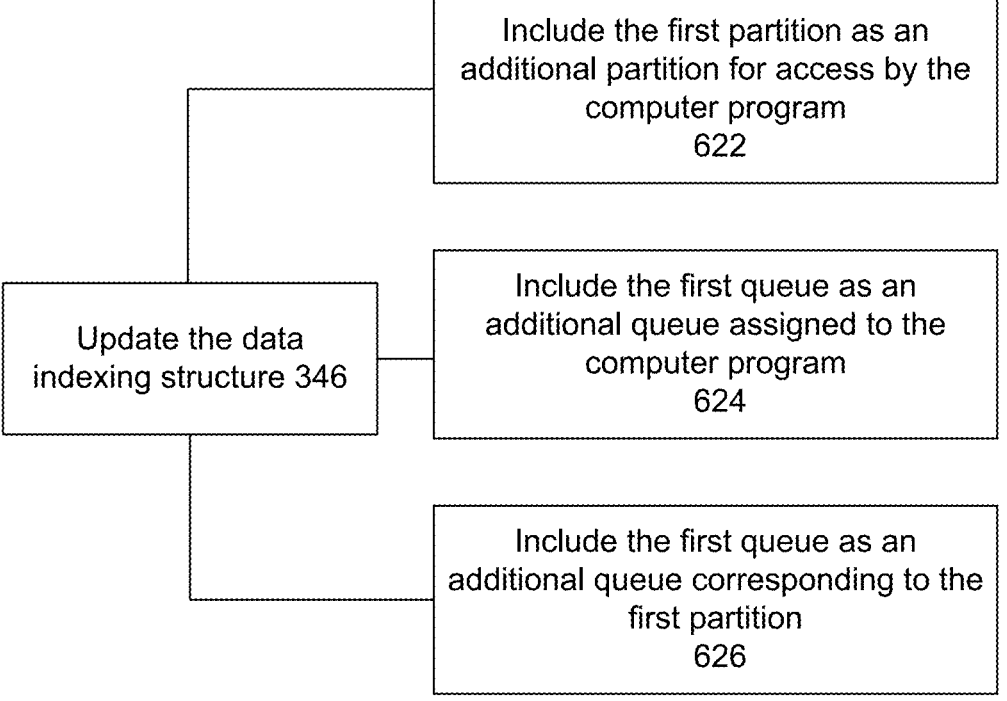
FIG. 6b is a flow diagram of updating the data indexing structure according to one embodiment.

Referring to FIG. 6, the data indexing structure 500 may be updated to include 622 the first partition as an additional partition configured for access by the computer program, together with the previously assigned partition that the computer program is configured to access. That is, after performing step 622, the computer program will authentically access more than one partition of the storage medium 108.

The data indexing structure 500 may also be updated to include 624 the first queue as an additional queue of the plurality of queues 105 assigned to the computer program, together with the previously assigned queue corresponding to the first partition. After performing step 624, more than one queue may be assigned to the computer program to access the DSD 100. In such cases, in response to receiving a data access request by the computer program, the driver of the host computer 130 may choose any one queue of a plurality of the assigned queues to transmit the data access request to the storage medium 108.

The data indexing structure 500 may further be updated 626 to include the first queue as an additional queue of the plurality of queues 128 corresponding to the first partition, together with the previously assigned one or more queues corresponding to the first partition. That is, after performing step 626, more than one queue will correspond to the first partition of the storage medium 108.

The method 300 may also comprise in response to receiving 342 the second credential, allowing the data access request 132 by allowing access to the first partition. Similar to the one-time authentication, upon receiving the second credential, the DSD 100 may also allow the computer program to perform the access operations specified by the data access request (e.g., read, write, modify or delete).

Further, as a result of updating 346 the data indexing structure 500, the DSD 100 may allow 348 one or more future data access requests from the computer program 100 to access the first partition using the first queue. That is, after completing the long-term authentication, the computer program is configured to authentically access the first partition of the storage medium 108 using the first queue.

In a described example, referring back to FIG. 2, in response to the DSD 100 determining the data access request to the first partition (i.e., Partition A) by the unknown computer program 125 using the first queue (i.e., Queue n) is not authentic, the DSD 100 provides one or more authentications 208 (e.g., the one-time authentication and/or the long-term authentication) to the host computer 130. In response to receiving the first and/or the second credential from the host computer system 130, the DSD 100 may allow the data access request 206 by the unknown computer program 125 to the first partition (i.e., Partition A).

In this example, in response to receiving the second credential for the long-term authentication, the DSD 100 may further update the data indexing structure 500 to include: i) the first partition (i.e., Partition A) as the assigned partition configured for access by the unknown computer program 125; ii) the first queue (i.e., Queue n) as the queue assigned to the unknown computer program 125; and/or iii) the first queue (i.e., Queue n) as the additional queue, together with Queue 1 corresponding to the first partition (i.e., Partition A). Upon completing the long-term authentication, the DSD 100 may allow 348 future data access requests from the computer program 100 to access the first partition using the first queue. In this case, the user's financial data used by the banking computer program 121 will not be shared with the unknown computer program 125, as different queues (i.e., Queue 1 and Queue n) are used by the two computer programs.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited.

Similarly, it is to be noticed that the term connected, when used in the claims, should not be interpreted as being limited to direct connections or couplings only. The term "connected", along with its derivatives, may be used. It should be understood that the scope of the expression a device A "connected to" a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still cooperate or interact with each other.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for assessing a data access request to a data storage device (DSD) by a computer program, the method comprising:

assigning a plurality of queues to a plurality of computer programs, wherein each computer program is configured to authentically access one partition of a plurality of partitions of a non-volatile storage medium of the DSD using one queue of the plurality of queues assigned to that computer program and corresponding to that one partition;

receiving, from the computer program, a data access request to access a first partition of the plurality of partitions using a first queue of the plurality of queues; and assessing the data access request by:

determining whether the one queue of the plurality of queues corresponding to the first partition is the first queue;

determining whether the one partition of the plurality of partitions that the computer program is configured to access is the first partition;

determining the data access request is authentic in response to determining that:

the one queue of the plurality of queues corresponding to the first partition is the first queue; and the one partition of the plurality of partitions that the computer program is configured to access is the first partition; and determining the data access request is not authentic responsive to determining that:

the one queue of the plurality of queues corresponding to the first partition is not the first queue; or the one partition of the plurality of partitions the computer program is configured to access is not the first partition; and attempting to authenticate, responsive to determining that the data access request is not authentic, the data access request in a different way.

2. The method of claim 1, wherein:

the data access request comprises a command to read, write, modify, or delete data in a logical address in the first partition; and the data access request is received in the first queue.

3. The method of claim 2, wherein:

determining whether the one queue of the plurality of queues corresponding to the first partition is the first queue comprises:

detecting, responsive to receiving the data access request, a first queue identifier for the first queue;

detecting, based on the logical address, the first partition for the data access request; and comparing the first queue identifier to a second queue identifier associated with the first partition.

4. The method of claim 1, wherein:

assigning the plurality of queues to the plurality of computer programs comprises generating a data indexing structure having information for each computer program; and the data indexing structure includes:

the one partition of the plurality of partitions that each computer program is configured to access; and the one queue of the plurality of queues assigned to that computer program.

5. The method of claim 4, wherein the data indexing structure further includes, for each partition of the plurality of partitions, the one queue of the plurality of queues corresponding to that partition of the plurality of partitions.

6. The method of claim 4, wherein determining whether the one queue of the plurality of queues corresponding to the first partition is the first queue and determining whether the one partition of the plurality of partitions the computer program is configured to access is the first partition comprises retrieving information from the data indexing structure.

7. The method of claim 1, wherein each queue of the plurality of queues comprises a queue identifier used by a driver of a host computer system to assign one queue of the plurality of queues to one computer program of the plurality of computer programs.

8. The method of claim 7, wherein determining whether the one queue of the plurality of queues corresponding to the first partition is the first queue includes:

determining whether a first queue identifier of the first queue matches a second queue identifier of the one queue of the plurality of queues corresponding to the first partition; and in response to determining the first queue identifier matches the second queue identifier, determining the one queue of the plurality of queues corresponding to the first partition is the first queue.

9. The method of claim 1, wherein assigning the plurality of queues to the plurality of computer programs further comprises:

retrieving data characteristics of data used by each computer program;

assigning, based on the data characteristics, each computer program to a partition of the plurality of partitions; and assigning each queue of the plurality of queues to the partition assigned based on the data characteristics for that computer program.

10. The method of claim 9, wherein the data characteristics are selected from:

data structures used by that computer program;

data types used by that computer program; and data variables used by that computer program.

11. The method of claim 1, wherein the attempting to authenticate the data access request a different way includes providing a one-time authentication for the data access request.

12. The method of claim 1, wherein the attempting to authenticate the data access request a different way includes providing a long-term authentication to authenticate the computer program to access the first partition using the first queue.

13. The method of claim 1, wherein attempting to authenticate the data access request in a different way includes receiving, from a user of a host computer system:

a first credential for a one-time authentication for the data access request; and/or a second credential for a long-term authentication for the computer program to access the first partition using the first queue.

14. The method of claim 13, further comprising:

in response to receiving the first credential, allowing the data access request by allowing access to the first partition by the computer program on a one-off basis.

15. The method of claim 13, further comprising, in response to receiving the second credential:

updating a data indexing structure having information for each computer program to include:

the first partition as an additional partition configured for access by the computer program;

the first queue as an additional queue of the plurality of queues assigned to the computer program; and/or the first queue as an additional queue of the plurality of queues corresponding to the first partition; and allowing the data access request by allowing access to the first partition.

16. The method of claim 1, wherein assigning the plurality of queues to the plurality of computer programs is based on data characteristics of each computer program of the plurality of computer programs.

17. The method of claim 16, wherein:

the data characteristics include a confidentiality of the data used by that computer program;;

the confidentiality of the data is grouped into a plurality of levels; and one or more computer programs of the plurality of computer programs having a same level of the plurality of levels are configured to access a same partition of the plurality of partitions.

18. The method of claim 1, wherein:

the DSD is a non-volatile memory express (NVMe) device including a plurality of I/O queues; and the plurality of queues are a subset of the plurality of I/O queues.

19. A data storage device (DSD) comprising:

a non-volatile storage medium configured to store data;

a data path configured to transmit at least data between the non-volatile storage medium and a host computer system; and one or more processors, individually or in combination, configured to:

assign a plurality of queues to a plurality of computer programs, wherein each computer program is configured to authentically access one partition of a plurality of partitions of the non-volatile storage medium using one queue of the plurality of queues assigned to that computer program and corresponding to that one partition;

receive, from a computer program, a data access request to access a first partition of the plurality of partitions using a first queue of the plurality of queues; and assess the data access request by:

determining whether the one queue of the plurality of queues corresponding to the first partition is the first queue;

determining whether the one partition of the plurality of partitions that the computer program is configured to access is the first partition;

determining the data access request is authentic in response to determining that:

the one queue of the plurality of queues corresponding to the first partition is the first queue; and the one partition of the plurality of partitions that the computer program is configured to access is the first partition; and determining the data access request is not authentic responsive to determining that:

the one queue of the plurality of queues corresponding to the first partition is not the first queue; or the one partition of the plurality of partitions the computer program is configured to access is not the first partition; and attempting to authenticate, responsive to determining that the data access request is not authentic, the data access request in a different way.

20. A data storage device (DSD) comprising:

a non-volatile storage medium configured to store data;

means for transmitting at least data between a host computer system and the data storage device;

means for assigning a plurality of queues to a plurality of computer programs, wherein each computer program is configured to authentically access one partition of a plurality of partitions of the non-volatile storage medium using one queue of the plurality of queues assigned to that computer program and corresponding to that one partition;

means for receiving, from a computer program, a data access request to access a first partition of the plurality of partitions using a first queue of the plurality of queues; and means for assessing the data access request by:

means for determining whether the one queue of the plurality of queues corresponding to the first partition is the first queue;

determining whether the one partition of the plurality of partitions that the computer program is configured to access is the first partition;

determining the data access request is authentic in response to determining that:

the one queue of the plurality of queues corresponding to the first partition is the first queue; and the one partition of the plurality of partitions that the computer program is configured to access is the first partition; and determining the data access request is not authentic responsive to determining that:

the one queue of the plurality of queues corresponding to the first partition is not the first queue; or the one partition of the plurality of partitions the computer program is configured to access is not the first partition; and means for attempting to authenticate, responsive to determining that the data access request is not authentic, the data access request in a different way.

* * * * *